…

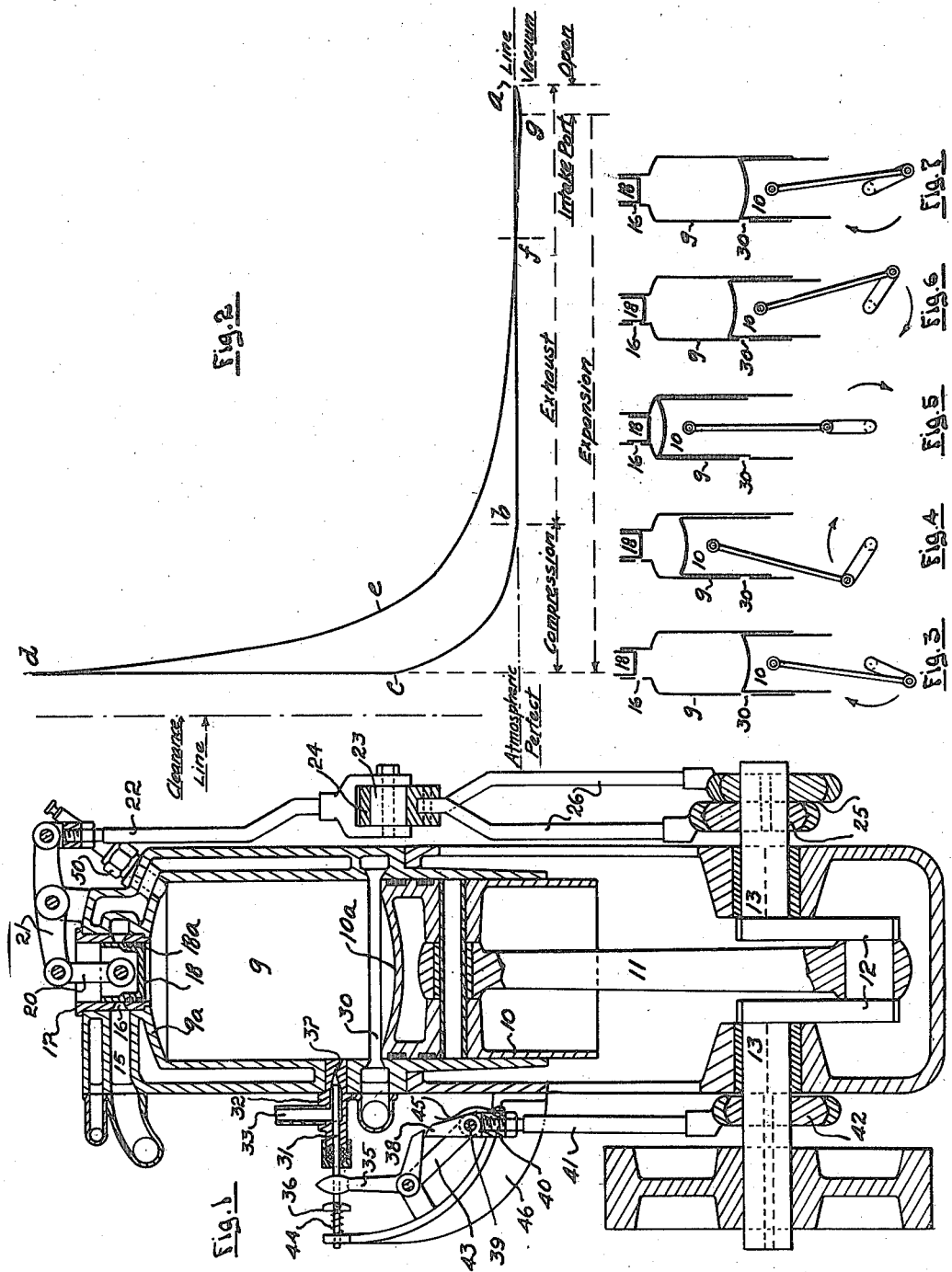

UNITED STATES PATENT OFFICE.

REINHOLD JOHNSON, OF BROOKLYN, NEW YORK.

INTERNAL-COMBUSTION ENGINE.

1,137,142.  Specification of Letters Patent.  Patented Apr. 27, 1915.

Application filed December 23, 1912. Serial No. 738,236.

*To all whom it may concern:*

Be it known that I, REINHOLD JOHNSON, a citizen of Finland, and resident of the borough of Brooklyn, in the county of Kings and State of New York, have invented certain new and useful Improvements in Internal-Combustion Engines, of which the following is a specification.

This invention relates to internal combustion engines of the two cycle type.

One of the objects is the production of an engine operating under an exclusively differential pressure cycle, and wherein the expansion of the gases of combustion of an ignitible charge is uninterruptedly carried on in a closed cylinder until the pressure is reduced to less than that of the intake or atmosphere.

Another object is to provide means for opening the cylinder at or near the completion of the working cycle so that a fresh charge at normal intake pressure will spontaneously enter on the same side of the piston where the lowered pressure is produced, by virtue of the difference between terminal and intake pressures, when the piston is at or near the end of its outstroke.

Still another object is to employ the inherent rarefactory state of the gases of combustion at the conclusion of the power stroke to effect the introduction of a new charge, thereby dispensing with all forms of mechanical means for producing an artificial condition within the cylinder, whether it be drawing in or forcing a new charge thereinto or forcefully extracting the burnt gases therefrom.

A further object is to provide improved means; first, to admit the new charge into the cylinder proper directly at its coolest point when the piston is at or near the end of its outstroke, so as to avoid unduly raising the temperature of this charge; secondly, to cause the admission of the new as well as the exit of the burnt charge to take place in the direction of the return stroke of the piston so as to keep these charges from intermingling; thirdly, to prevent the new charge from reaching the exhaust port in the hottest part of the cylinder until compression occurs at the last part of the return stroke, thus insuring properly timed ignition; and fourthly, to make the exhaust valve automatically differentiate the pressures between the incoming and outgoing charges and thereby control the power of the engine.

Still another object is to provide an economical and reliable internal combustion engine of simple construction.

Further objects and advantages will become apparent as the description proceeds.

With these objects in view the invention comprises the improvements and combination of parts hereinafter described and pointed out in the appended claims, reference being had to the accompanying drawings in which:—

Figure 1 is a sectional elevation of one exemplification of the invention. Fig. 2 is a diagram of the operating cycle of the engine, and Figs. 3, 4, 5, 6 and 7 are diagrammatic views showing the relative positions of the working parts during an operating cycle.

In these views the numeral "9" is the power cylinder having a piston 10, coupled by means of a connecting rod 11, to the crank 12 of the shaft 13. The opposed surfaces of the cylinder head and piston are preferably reversely dished as at $9^a$ and $10^a$ respectively. The inner or head end of the cylinder communicates with the exhaust passage 15 through a circumferential port 16 in a sleeve 17. A piston valve 18 of the inverted trunk type, provided with conventional packing rings $18^a$ operates in the sleeve 17 to control the escape of the exhaust. A link 20 connects the valve 18 with a rocking lever 21, the outer end of which is connected by means of a reach rod 22 to a block 23 slidable in a slotted linked 24. A pair of eccentrics 25, keyed to the shaft 13, have their rods pivotally connected with the ends of the slotted link 24. By shifting the said link relatively to the position of the block 23 the position of the valve 18 may be changed after the manner of the known slotted link reversing gear. At or near the outer end of the stroke of the piston is a circumferential port 30 for inlet of the new charge, which may be in the nature of a combustible mixture or air alone. In the latter case, liquid fuel is admitted at the proper point of the stroke, which may be either before or after the admission of the air charge, through a needle valve 31 acting against the seat of a valve body 32 into which the fuel flows from any extraneous source through a pipe 33. The liquid fuel is preferably delivered to the needle valve under pressure, as by means of a pump or from an overhead reservoir, so that it is positively injected into the cylinder. The means for admitting liquid fuel, when employed, is preferably located in the side of the cylinder adjacent and above the air port 30. A small passage 37, leading from the seat of the liquid fuel valve, is inclined so as to direct the issuing jet of liquid centrally against the dished head $10^a$ of the piston where it is vaporized by the heat of the metal, and mingles with the stratum of air, which is entering through the port 30.

The valve 31 is normally closed by a spring 44 finding an abutment against a bracket 46 and bearing against an adjustable stop 36 on the valve spindle. The latter is opened by means of a bell-crank lever 35 fulcrumed on the bracket and having one arm positioned to contact with the collar 36, and the other arm arranged to be lifted by a latching member 38, which is moved up and down by an eccentric 42 acting through a rod 41. The said latch 38 is pivoted at 39 to a head 40 on the upper end of the rod 41, and is pressed to the left against a rigid shoulder by a spring 45. A link 43, pivoted at opposite ends about the pivotal axis of the bell-crank 35 and the latch 38, operates on the upward movement to force the head 40 to the right, so that at a predetermined point of the stroke, after the fuel valve 31 has been opened for the proper period, the latch 38 escapes from the end of the horizontal arm of the bell-crank by virtue of which the spring 44 is free to close said valve. After the latch passes from under the horizontal arm of the bell-crank it moves to the right about its pivot 39 so that the eccentric rod 41 is not forced too far to the right. On the downward movement the latch 38 snaps back beneath the bell-crank 35.

As a mode of ignition an electric jump spark plug 50 is shown, but it is clear any other mode can be used.

In the operation of the engine commencing with the piston at the outermost position shown in Fig. 1 which corresponds to point $a$ on the diagram Fig. 2, atmospheric pressure has now full access to the interior of the cylinder 9 and a charge of air or of combustible mixture rushes in through the inlet port 30 at the coolest point of the cylinder, i.e. the part thereof which is farthest away from where ignition first takes place. This occurs before the exhaust port 16 is opened so that the new charge is admitted to the power cylinder while the partial vacuum exists therein and before the burned gases have escaped. In the position of the piston 10 indicated in Fig. 3 the piston has just closed the inlet port and the valve 18 has uncovered the exhaust port through which the spent gases pass out at normal pressure after the admission of the new charge until the position of the piston indicated in Fig. 4 is reached, which corresponds to point $b$ in Fig. 2. Now compression commences and continues up to point $c$ Fig. 2, shown also by the position of the piston in Fig. 5, which is at the hottest part of the cylinder, wherewith the new charge is allowed to come in contact only at the conclusion of the return stroke of the piston. Combustion now takes place and the pressure within the cylinder rises up to $d$ whereafter the gases expand on the line $e$ until the position represented by Fig. 6 is reached, corresponding to $f$ on the atmospheric line. From this point the gases expand below the atmospheric pressure so that a partial vacuum is formed directly in the cylinder on the same side of the piston where the explosion occurred. This point corresponds to $g$ in Fig. 2 and the moving parts are in the position indicated in Fig. 7. As the piston moves still farther outward the inlet port is uncovered and the vacuum broken, which causes the fresh charge to rush into the cylinder and equalize or normalize the pressure therein. This completes the cycle of operation, the several steps whereof all take place on the one and same side of the piston.

While the inlet port 30 is shown controlled by the piston, it will be obvious that it may be controlled by a valve. The valve mechanisms are so timed that the exhaust takes place after the admission of the new charge, and the injection of fuel, when this is employed, occurs either before or after the admission of the air charge. The exhaust valve is also timed to close its port at a point in the latter part of the return stroke so as to secure the mode of operation specified.

When it is desired to reverse the engine the slotted link 24 is moved relatively to the block 23, thereby causing the exhaust valve 18 to close earlier and entrap in the cylinder a certain amount of the exhaust gases which act as a buffer, and when the piston 10 pushes the fresh charge against this buffer the compression rises high enough to pre-ignite the combustible mixture before the piston reaches the end of its inward stroke, whereby the direction of motion thereof is arrested and reversed, the engine running equally as well in either direction. If the link 24 is moved a lesser amount, not sufficient to cause the valve 18 to entrap enough of the exhaust gases, no reversal of the engine will take place, but still the new charge will ignite by compression against the entrapped exhaust gas while the engine continues to run in the same direction.

It will be understood that the charges admitted to the engine are so proportioned to the volume of the cylinder that when the piston is at the end of its power stroke a chamber of such size is formed that the burnt gases filling it are below atmospheric pressure. It will be further noted that the cylinder is self-charging, due to the difference of pressures existing within and without the cylinder, the burnt gases therein having expanded down to a pressure inferior to that of the intake, whereas the new charge enters at normal pressure. Thus, the engine is distinguished from the common types of two-cycle engines hitherto used wherein the new charge is either forced into the cylinder in a pre-compressed state, or drawn into it by suction through the action of the piston.

Numerous advantages result from expanding the ignited gases below atmospheric pressure before the conclusion of the out stroke. All the energy of the fuel is utilized in the engine, the necessity of pre-compressing the charge, whether the latter be a combustible mixture obtained from an ordinary carbureter or merely air into which fuel is injected by the device shown, or other known or equivalent means, is avoided. The partial vacuum formed in the power cylinder operates to cushion the piston toward the end of its stroke, without causing it to do the large amount of negative work which is involved in crank case compression for example. Exhaust and water jacket losses are reduced to a minimum. In expanding the gases of combustion below intake pressure the temperature is correspondingly reduced, so that the exhaust pipes or manifolds do not have to be water-cooled and burning of corners or edges of cylinder ports and piston by the flow of the gases is avoided. In fact, the smaller sizes of engines can be used without water-cooling their cylinders. Silencing or muffling can be dispensed with, because the exhaust gases are driven out practically at atmospheric pressure. When a charge of combustible mixture or fuel is drawn in or injected into the partial vacuum formed in the cylinder perfect vaporization of any entrained liquid fuel is insured. By first forming a vacuum and then opening the communication for admission of charging air, or of combustible mixture, the charge will rush into the cylinder with considerable velocity, and by reason of its momentum will more completely fill that portion of the cylinder intended for it than if drawn in gradually. On account of the exhaust gases having a considerably lowered temperature they will not ignite the fresh mixture and cause back-firing or pre-ignition.

While the valve controlling the exhaust has been shown as located in the head of the cylinder and the air or combustible mixture inlet port at the opposite end thereof, the construction is not necessarily limited to this preferred arrangement. Further no limitation is intended as to the location of the fuel injecting device, as this may be constructed and arranged to deliver into the compression space at or about the end of the return stroke of the piston.

It will be readily understood that a double acting engine using one inlet port may be constructed on the same principle which has been disclosed.

Having described my invention what I desire to secure by Letters Patent and claim is:—

1. The herein described method of operating an engine under a differential pressure cycle by the combustion of an ignitible charge, which consists in expanding the burnt gases in the cylinder until their pressure is reduced to less than that of the atmosphere or intake, and opening the cylinder when the piston is at or near the end of its outstroke so that a new charge at normal pressure will spontaneously enter by virtue of the difference between terminal and intake pressures.

2. The method of operating an engine under a differential pressure cycle by the combustion of an ignitible charge, which consists in carrying on the expansion of the burnt gases in a closed cylinder until their pressure is reduced to less than the intake or atmospheric pressure, opening the cylinder so that a new charge at normal pressure will spontaneously enter thereinto by virtue of the difference between terminal and intake pressures when the piston is at or near the end of its outstroke, the new charge entering the cylinder at its coolest point and displacing the gases of combustion adjacent the face of the piston, the burnt gases being forced out ahead of this charge in the direction of the return stroke of the piston whereby the new charge reaches the hottest part of the cylinder only during compression, which occurs at the last part of the return stroke, thus assuring properly timed igniton.

3. The method of operating an engine under a differential pressure cycle by the combustion of an ignitible charge, which consists in uninterruptedly expanding the burnt gases until the pressure thereof is reduced to less than that of the intake or atmospheric pressure, opening the cylinder so that a new charge at normal pressure will spontaneously enter thereinto by virtue of the difference between terminal and intake pressures when the piston is at or near the end of its outstroke, forcing out the burnt gases ahead of the new charge, and causing the exhaust valve to automatically differentiate the pressures between the incoming and outgoing charges, thereby varying the point at which ignition occurs and consequently the power of the engine.

4. A combustion engine operating under a differential pressure cycle comprising a cylinder, a piston therein allowing the burned gases to expand below intake pressure, said cylinder having the inlet and exhaust at opposite ends, said piston uncovering the inlet at or near the end of the outstroke thereof to permit spontaneous entrance of a new charge at normal pressure adjacent to the face of the piston after the inferior pressure has been obtained in the cylinder, the exhaust permitting of the burnt gases being driven out ahead of the new charge on the return stroke of the piston, and means capable of automatically differentiating the pressures between the incoming and outgoing charges and controlling said exhaust so that the piston during the last part of its return stroke causes compression of the new charge, whereafter ignition takes place.

5. A two cycle combustion engine operating under automatically differentiating pressure comprising a cylinder, a piston in said cylinder allowing the burned gases to expand below intake or atmospheric pressure, said cylinder having an inlet port adjacent to the face of the piston when the latter is at or near the end of its outstroke, said piston uncovering said inlet port to admit of a new charge at normal pressure entering the cylinder spontaneously after the inferior pressure has been obtained therein, the charge received in the cylinder being solely due to the difference between terminal and intake pressures and displacing the burnt gases adjacent to the piston, the amount of the new charge being determined by the equalization of the interior and intake pressures, said cylinder having at the opposite end to the inlet an exhaust port through which the burnt gases preceding the new charge are driven out on the return stroke of the piston, and a valve for said exhaust port capable of automatically differentiating the pressures between the incoming and outgoing charges and controlling the compression of the new charge by the piston on the last part of its return stroke, the ignition of the charge occurring thereafter, and the other steps in the operative cycle all taking place on the one side of the piston.

6. A two-cycle combustion engine operating under automatically differentiating pressures comprising a cylinder, a piston in the latter allowing the burned gases to expand below intake pressure, said cylinder having an inlet port at its coolest point adjacent to the face of the piston, at or near the end of the outstroke thereof, said piston uncovering said inlet port to admit of a new charge at normal pressure spontaneously entering the cylinder after the inferior pressure has been obtained therein, the charge received in the cylinder being due solely to the difference between terminal and intake pressures and repelling the burnt gases from the piston, the displaced gases isolating the new charge from the hottest part of the cylinder where the combustion takes place, said cylinder having at the opposite end to the inlet an exhaust port through which the burnt gases preceding the new charge are driven out on the return stroke of the piston previously to the combustion of the new charge, and a valve capable of automatically differentiating the pressures between the incoming and outgoing charges and controlling the escape of the burnt gases and the compression of the new charge by the piston during the last part of its return stroke, the amount of escape of the burnt gases determining the quantity of new charge entering the cylinder at normal pressure while the exhaust is closed.

7. A two-cycle combustion engine operating under automatically differentiating pressures wherein the steps constituting the operative cycle take place on the same side of the piston, comprising a cylinder, a piston therein allowing the burned gases to expand below intake pressure, said cylinder having an inlet port at the remote point from where the combustion takes place, said piston when at or near the end of its outstroke uncovering said inlet port to admit of a new charge entering the cylinder at the coolest point thereof solely by reason of the inherent conditions existing therein, after the inferior pressure has been obtained, the charge received in the cylinder repelling the burnt gases from the face of the piston, the displaced gases preventing the new charge from coming in contact with the hottest part of the cylinder, the latter being provided with an exhaust port, and valve mechanism therefor capable of automatically differentiating the pressures between the incoming and outgoing charges, said mechanism including an adjustable connection between the valve and the piston whereby the former will open at different points in the stroke of the latter so that the burnt gases preceding the new charge may be driven out previously to the combustion thereof, whereby the quantity of new charge entering the cylinder is determined, said exhaust valve being also capable of closing at different points during the last part of the return stroke of the piston so as to entrap variable amounts of the burnt gases and thereby govern the compression and ignition.

8. A combustion engine operating under a differential pressure cycle comprising a self-charging working cylinder with inlet and exhaust at opposite ends thereof, a piston reciprocable in said cylinder to and beyond the outer edge of said inlet, the cylinder allowing expansion of the burned gases below intake pressure during the outstroke of the piston and subsequently permitting the spontaneous entrance of a new charge bringing the pressure therein to normal, the new charge admitted by virtue of the difference existing between the terminal pressure within the cylinder and the intake pressure and displacing the burnt gases from the face of the piston, repelling them in the direction of the exhaust, and valve mechanism controlling the latter capable of automatically differentiating the pressures between the incoming and outgoing charges, said mechanism including an element moved by the piston, and a connection between the element and said valve whereby the exhaust may be opened during the first part of the return stroke of the piston to let out the burnt gases while the new charge reaches the point of compression, and closed during the last part of the return stroke as the charge is being compressed and ignited.

Signed in the borough of Manhattan in the county of New York and State of New York this 20th day of December A. D. 1912.

REINHOLD JOHNSON.

Witnesses:
H. C. KARLSON,
W. H. GEE.